(12) United States Patent
Van Vlassenrode et al.

(10) Patent No.: US 11,712,824 B2
(45) Date of Patent: Aug. 1, 2023

(54) METHOD OF MANUFACTURING A SUBSTRATE FOR A FLOOR PANEL

(71) Applicant: FLOORING INDUSTRIES LIMITED, SARL, Bertrange (LU)

(72) Inventors: Kristof Van Vlassenrode, Deinze (BE); Filip Bossuyt, Avelgem (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 940 days.

(21) Appl. No.: 16/471,701

(22) PCT Filed: Jan. 8, 2018

(86) PCT No.: PCT/IB2018/050100
§ 371 (c)(1),
(2) Date: Jun. 20, 2019

(87) PCT Pub. No.: WO2018/130924
PCT Pub. Date: Jul. 19, 2018

(65) Prior Publication Data
US 2020/0016799 A1    Jan. 16, 2020

Related U.S. Application Data

(60) Provisional application No. 62/444,951, filed on Jan. 11, 2017.

(30) Foreign Application Priority Data

Jun. 15, 2017   (BE) .................................. 2017/5429

(51) Int. Cl.
*B29C 44/30* (2006.01)
*B29C 44/32* (2006.01)
(Continued)

(52) U.S. Cl.
CPC ............ *B29C 44/30* (2013.01); *B29C 43/003* (2013.01); *B29C 43/28* (2013.01); *B29C 43/48* (2013.01);
(Continued)

(58) Field of Classification Search
CPC ..... B29C 44/30; B29C 44/329; B29C 44/003; B29C 44/28; B29C 44/48; B29K 2027/06;
(Continued)

(56) References Cited

U.S. PATENT DOCUMENTS 4,923,658 A    5/1990   Hover et al.

FOREIGN PATENT DOCUMENTS

BE    1023446 A1    3/2017
BE    1024617 A1    4/2018
(Continued)

OTHER PUBLICATIONS

International Search Report and Written Opinion in corresponding PCT Application No. PCT/IB2018/050100, dated May 17, 2018.
(Continued)

*Primary Examiner* — Jeffrey M Wollschlager
*Assistant Examiner* — Xue H Liu
(74) *Attorney, Agent, or Firm* — Workman Nydegger

(57) ABSTRACT

A method for manufacturing a single- or multi-layered substrate, which is suitable for a floor panel, where, for forming a substrate layer, thermoplastic material is strewn, for example, onto a transport device. The strewn thermoplastic material is consolidated under the influence of pressure and/or heat, preferably in a press device, where the thermoplastic material to be strewn comprises micronized material.

18 Claims, 3 Drawing Sheets

(51) Int. Cl.
*B29C 43/00* (2006.01)
*B29C 43/28* (2006.01)
*B29C 43/48* (2006.01)
*B29K 27/06* (2006.01)
*B29K 105/04* (2006.01)
*B29K 105/00* (2006.01)
*B29K 309/08* (2006.01)
*B29L 31/00* (2006.01)

(52) U.S. Cl.
CPC ........ *B29C 44/329* (2016.11); *B29K 2027/06* (2013.01); *B29K 2105/04* (2013.01); *B29K 2105/251* (2013.01); *B29K 2309/08* (2013.01); *B29L 2031/732* (2013.01)

(58) Field of Classification Search
CPC .......... B29K 2105/04; B29K 2105/251; B29K 2309/08; B29L 2031/732
See application file for complete search history.

(56) References Cited

FOREIGN PATENT DOCUMENTS

| | | |
|---|---|---|
| BE | 20165869 A1 | 5/2018 |
| BE | 1024734 A1 | 6/2018 |
| BE | 20165868 A1 | 6/2018 |
| BE | 20155572 A1 | 5/2019 |
| EP | 0520151 A1 | 12/1992 |
| EP | 1938963 A1 | 7/2008 |
| JP | S62160211 A | 7/1987 |
| WO | 9747834 A1 | 12/1997 |
| WO | 0175247 A1 | 10/2001 |
| WO | 2011141849 A2 | 11/2011 |
| WO | 2013178561 | 12/2013 |
| WO | 2013179261 A1 | 12/2013 |

OTHER PUBLICATIONS

Belgian Search Report in corresponding Belgian Application No. 201705429, dated Jan. 4, 2018.

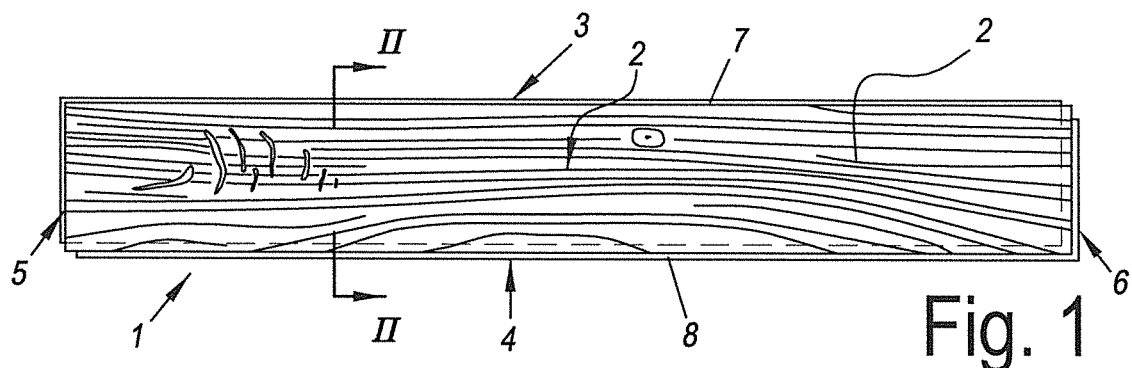
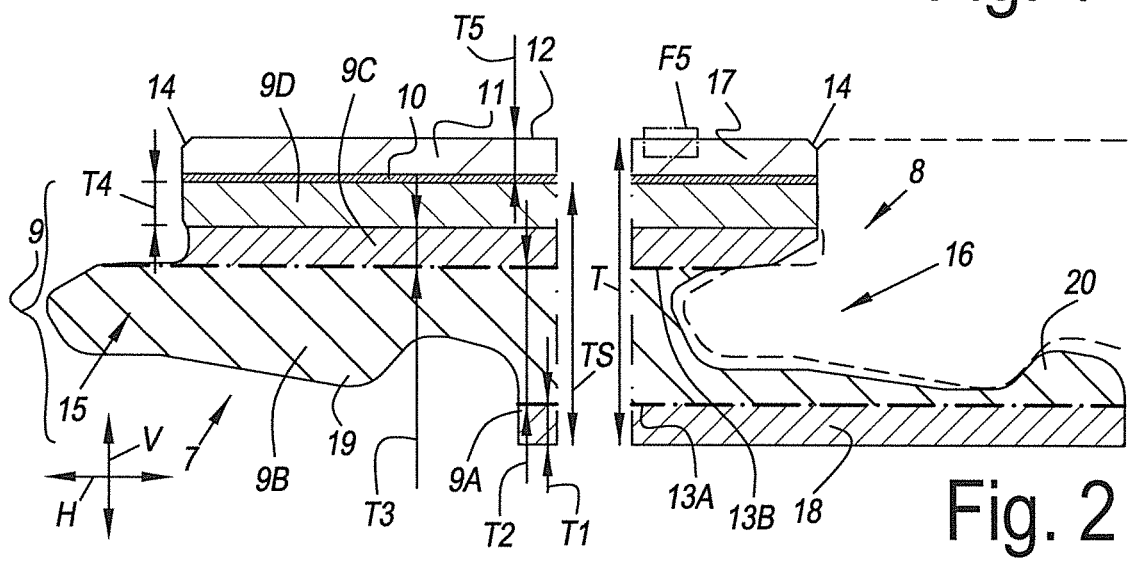
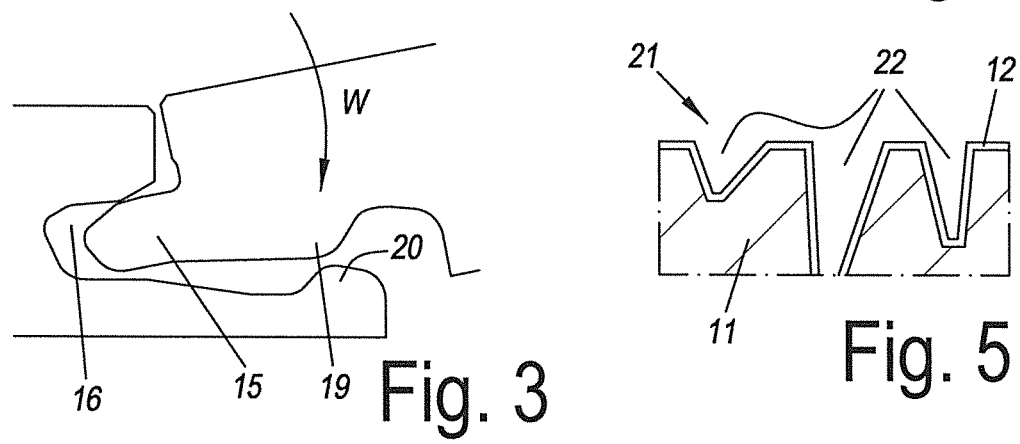
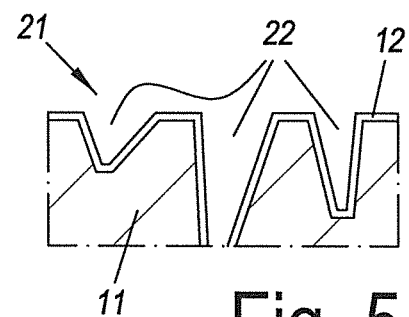
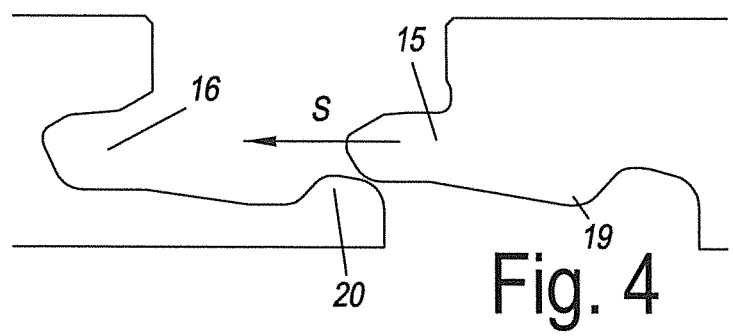

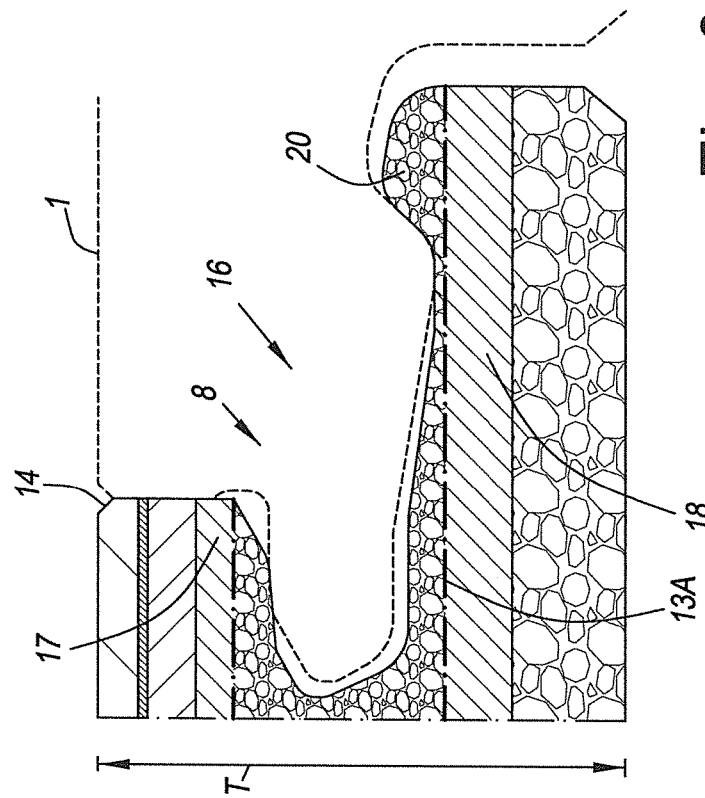
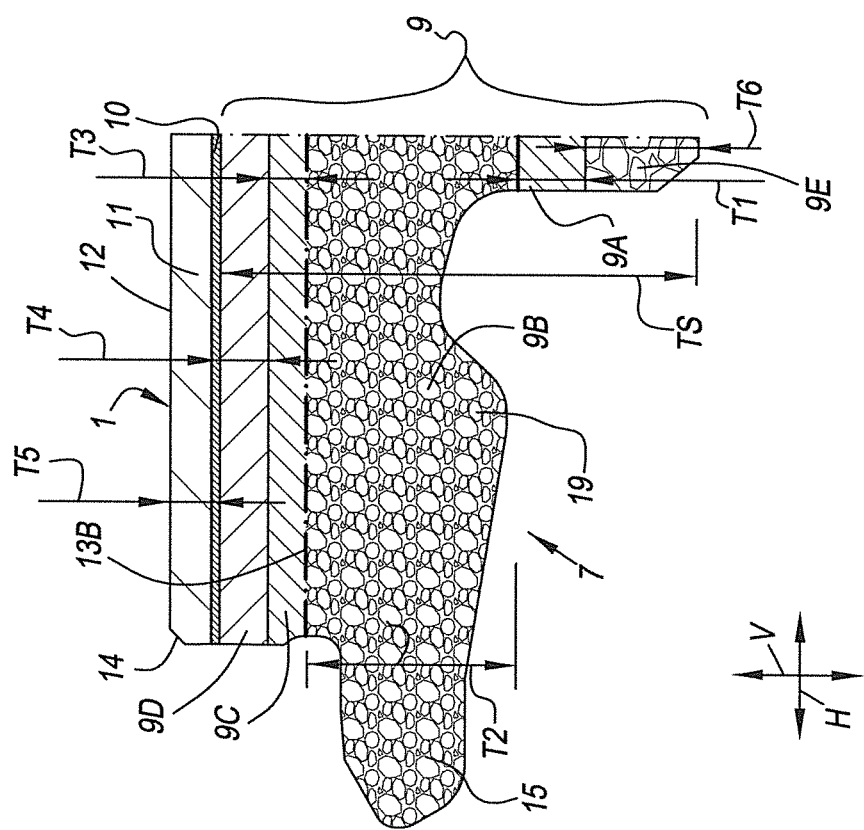
Fig. 6

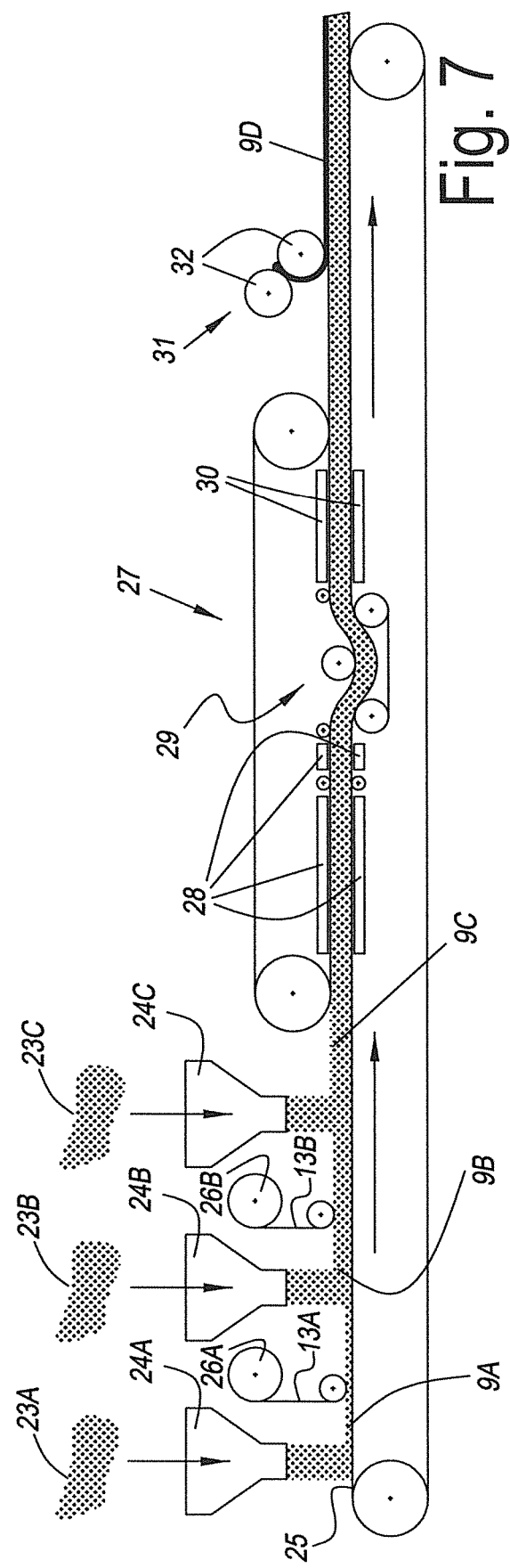

METHOD OF MANUFACTURING A SUBSTRATE FOR A FLOOR PANEL

CROSS REFERENCE OF RELATED APPLICATIONS

This application claims the benefit under 35 U.S.C. 119(e) to U.S. provisional applications 62/444,951 filed on Jan. 11, 2017.

This invention relates to a method for manufacturing a substrate which is suitable for a floor panel, more particularly a floor panel having a substrate or substrate layer of thermoplastic material. By "thermoplastic material", material is understood which comprises a thermoplastic synthetic material, such as PVC (Polyvinyl chloride), and in addition possibly other components, such as an additive, for example, plasticizer, and/or filler.

BACKGROUND OF THE INVENTION

Such floor panels have become well known in the meantime. In document EP 1 938 963, the thin floor panel comprises one or more substrate layers of flexible PVC. Although this floor panel is water-resistant and, due to the PVC-based top layer, offers an agreeable walking comfort, it is not really ergonomic, notwithstanding the limited thickness thereof. It is heavy and, due to the inherent flexibility, it is difficult to install. Also, the flexible substrate shows a non-negligible risk of telegraphy, wherein after a certain period of time unevennesses in the subfloor will become visible at the surface of the floor panels. The floor panel from the document WO 2011/141849 responses to these disadvantages by its substrate consisting of foamed thermoplastic material and in particular of so-called "closed-cell" foam. This substrate is light-weight and forms a barrier against telegraphy. It is formed by means of extrusion. This technique, however, has a low production speed, and moreover the possible filling degree of the obtained substrate is limited.

SUMMARY OF THE INVENTION

The method of the invention is of the type wherein, for forming a substrate layer, thermoplastic material is strewn, for example, on a transport device, and this strewn thermoplastic material is consolidated under the influence of pressure and/or heat, preferably in a press device. From document WO 2013/179261, such method is known. Herein, the thermoplastic material to be strewn consists of granulate. A disadvantage thereof is that this material, certainly when it is rigid granulate, consolidates slowly, which is detrimental for the line speed. Another disadvantage is that with the granulate, it seems difficult to obtain an acceptable foaming in the substrate. The blowing agent in the granulate in fact seems to have partially lost its function in the granulating process. Document BE 2015/5572, also on behalf of the present applicant, responses to this last-mentioned disadvantage by strewing dryblend material instead of granulate. This dryblend material itself is thermoplastic. It is a dry free-flowing powder mixture, which, besides the synthetic material powder, may contain other powder-shaped components, such as an additive, for example, plasticizer, and/or filler. Blowing agent that is blended into such dryblend, contrary to granulate, will keep its function in good order, by which a better foaming is obtained. However, with this material it seems to be difficult to obtain a high filling degree in the substrate without this substrate becoming too brittle.

Primarily, the present invention relates to an alternative method of the aforementioned type, wherein according to various preferred embodiments solutions are offered to problems of the state of the art.

To this aim, the invention, according to a first independent aspect, relates to a method of the aforementioned type, with the characteristic that the thermoplastic material to be strewn comprises micronized material. By "micronized material", material is understood which has undergone micronization. This is a process which reduces the particle size, often into the micrometer range or possibly even into the nanometer range. The micronized material thus is obtained by reducing the size of the particles of a material. The average particle size of the micronized material, expressed as the D-50 value or the median of the distribution, preferably is smaller than 1 millimeter (mm). The micronization step may form part of the method. In such case, the method of the invention preferably comprises the preceding step of forming a granulate by separating granulate grains from an extrudate of at least a thermoplastic synthetic material, and possibly additives, such as plasticizer and filler, and the preceding step of, preferably mechanically, comminuting said granulate. Such preceding steps preferably are performed offline. For clarity's sake, it is noted that the micronized material is thermoplastic material and thus comprises a thermoplastic synthetic material, such as PVC, and moreover possibly an additive, such as plasticizer, and/or filler. The micronized material is rather small compared to, for example, granulate or even micro-granulate. Moreover, there is a certain variation of the particle size, contrary to granulate, where the grains have a practically uniform diameter. Thus, in the micronized material very small as well as larger particles are present. It has proven possible to obtain a higher line speed with this material. Namely, by the fine distribution in the material a faster fusion and consolidation is obtained. Presumably, also less air spaces functioning as insulators are present between the strewn particles, as the smaller particles will nest between the larger ones, which can contribute to the faster fusion. In this material, it is also easier to obtain a high filling degree, which is not only economically advantageous, but, for example, can also enhance the rigidity of the substrate. Compared to dryblend material, a better blending of the filler can be realized, with as a result a reduced risk of a substrate being too brittle. The fine distribution of the micronized material also enables realizing the substrate layer very thin. For a given substrate thickness, this means that more substrate layers can be present in the substrate, which results in a larger configuration freedom, which will be described later on.

The micronized material preferably is obtained by means of a mechanical comminuting process, preferably mechanically comminuting granulate. For example may the micronized material be obtained by milling material or by rendering it fine by means of another technique. Herein, the particles of this last-mentioned material can be subjected to a mutual impact, by which, due to mutual friction, the material is finely pulverized. Or the material can be broken in a so-called ball mill (English: ball mill). It is possible that still a selection is performed of the milled or pulverized material in order to obtain the micronized material, which is possible, for example, by sieving. The milling or pulverizing process can be performed again on the not-selected material.

Preferably, the micronized material has a particle size distribution wherein the median D50 and the tenth percentile D10 fulfill the following feature:

$(D50-D10)/D50 > 50 > 50\%$ and preferably larger than 75%.

With such particle size distribution is obtained that there are sufficiently small particles which can fill up the free space between the larger particles.

The material which is micronized can be any thermoplastic material, however, preferably it comprises granulate or, as a particular form of granulate, micro-granulate. This type of material has the advantage that due to the granulating process a good blending among the components can be realized. Thereby, a high proportion of filler can be obtained in the granulate without problems, and thus in the micronized material, too. The grains of the granulate can be spherical, however, it is not excluded that these grains have another shape and, for example, are disk-shaped or pyramidal. Or, for the micronized material it can be started from thermoplastic material to be milled. This material to be milled originates, for example, from remainder, waste or recycling streams. This may relate, for example, to scrap material obtained from, for example, profiles or pipes, such as PVC profiles or PVC pipes. With this material to be milled, too, a high filling degree can be obtained without problems.

It is not excluded that the thermoplastic material to be strewn is a mixture of the micronized material and another material. This other material is, for example, granulate, micro-granulate and/or dryblend. Granulates relate to grains which are obtained by subdividing an extrudate of the thermoplastic material, inclusively possible additives or fillers. The grains preferably have an average particle size of less than 3 millimeters, or still better less than 2 millimeter. By a dryblend, the also above-mentioned freely flowing powder mixture is intended. The mixture of micronized material, preferably obtained by micronizing granulate or micro-granulate, and another material, such as granulate, micro-granulate and/or dryblend, can have been prepared beforehand and then introduced into a strewing unit and be strewn. Or, the micronized material can be introduced into the strewing unit apart from the other material and mixed with the other material therein and thereafter can be strewn together with the other material. It is noted that it is not excluded that the thermoplastic material exclusively consists of the micronized material and only this micronized material is used for forming the substrate layer. In respect to a very fast consolidation, this even is desirable.

In the cases in which the micronized material is applied in a blend with a granulate or micro-granulate, this granulate or micro-granulate preferably shows an average particle size which is at least twice the D50 value of the micronized material. In this manner, the features of the micronized material and the granulate can be combined in an optimum manner. Preferably, the average particle size of the granulate is larger than the ninetieth percentile of the particle size distribution of the micronized material.

The particle size of the micronized material preferably is not too small as this renders it difficult to consolidate the strewn material to a stable whole. A good balance is obtained between obtaining, on the one hand, a higher line speed and, on the other hand, a stable consolidated whole when the average particle size of the micronized material, expressed as the D-50 value or median of the distribution, is situated between 100 and 750 micrometer. Preferably, this particle size is situated between 100 and 500 micrometer. An ideal value, as the inventor has found, is approximately 300 micrometer. As also explained above, a particle size distribution with a D50 of 300 micrometer preferably has a tenth percentile smaller than 150 micrometer, or more particularly a tenth percentile smaller than 75 micrometer. In the case wherein such micronized material is applied in a blend with granulate or micro-granulate, the granulate/micro-granulate preferably shows an average particle size of more than 600 micrometer.

The micronized material preferably comprises PVC. This can be rigid, semi-rigid or flexible PVC. In rigid PVC, no plasticizer is present or less than 15 phr of plasticizer. This latter means that the micronized material comprises less than 15 parts of plasticizer per 100 parts of PVC. If plasticizer is applied in the rigid PVC, this preferably is in an amount of less than 12 phr, less than 10 phr or even less than 5 phr. With semi-rigid or flexible PVC, the amount of plasticizer is at least 15 phr. As a plasticizer, phthalate-based plasticizers can be applied, such as di-isononyl phthalate, abbreviated DINP, or di-octyl phthalate, abbreviated DOP or DnOP, or, as an alternative for phthalate-based plasticizers, di-octyl terephthalate, abbreviated DOTP, or di-isononyl-1,2-cyclohexane dicarboxylate, abbreviated DINCH. Another type of plasticizer is not excluded. Notwithstanding the insight that the use of rigid PVC in the respective substrate layer offers many advantages, such as the resistance against telegraphy and the possibility of manufacturing strong coupling parts therefrom, it melts rather slow, with as a result a slow consolidation. However, by using it in micronized form, it will melt faster, such that a fast consolidation still is possible. Thus, the invention is particularly advantageous with this type of PVC and with rigid thermoplastic material in general.

The micronized material can comprise one or more of the following synthetic materials: PVC, polyethylene (PE), such as high-density polyethylene (HDPE), polypropylene (PP), polyethylene terephthalate (PET), polyurethane (PU) and elastomer. Another synthetic material is not excluded.

The micronized material can comprise filler, and preferably in a rather large amount. This is not only economically advantageous, but may also enhance, for example, the rigidity of the substrate. The amount of filler preferably is situated between 20 and 70 percent by weight, or between 30 and 60 percent by weight, in respect to the total weight of the micronized material. In this micronized material, such high filler proportion does not result in a brittle substrate layer, as the filler can be blended in very well. This is certainly the case when for the production of the micronized material it is started from granulate or material to be milled. It is clear that in such case the granulate or material to be milled comprises the same average amount of filler. Examples of types of filler which can be applied are an inorganic and/or mineral filler, such as chalk, talk, lime and/or sand, or an organic filler, such as wood, cork and/or bamboo particles.

The micronized material can comprise a copolymer, such as a vinyl acetate-based copolymer, for example, vinyl chloride-vinyl acetate, preferably in an amount between 20 and 40 phr. This means that per 100 parts of synthetic material, between 20 and 40 parts of copolymer are present. Via the copolymer, the melting temperature of the micronized material can be adjusted, by which the consolidation speed can be increased further. The application thereof is also useful when the strewn material is foamed, as will become clear from the further description.

The micronized material can comprise an impact modifier, a stabilizer, such as a Ca/Zn stabilizer, and/or a color pigment, such as carbon black.

It is also noted that the micronized material preferably shows one or more of the aforementioned characteristics, such as those in respect to the type of synthetic material, the type and the amount of filler, the presence of a copolymer, or the types of additives, as the material to be micronized, for example, the granulate or the material to be milled, also shows these characteristics.

As already mentioned, due to the fine distribution of the micronized material it is possible to make the respective substrate layer very thin. The thickness thereof after consolidating can be, for example, smaller than 1 mm or even smaller than 0.75 mm, for example, between 0.4 and 0.6 mm. This means that for a given substrate thickness this substrate can be constructed from a larger number of substrate layers, which results in a larger configuration freedom. The substrate layers can be made mutually different, for example, in the field of density, rigidity, degree of filling and/or foaming. It is not excluded that the substrate layer is made thicker. The thickness thereof preferably is situated between 0.4 and 6 mm, between 0.4 and 4 mm or between 0.4 and 3 mm.

Consolidation can even be sped up, as the inventor has found, by heating the thermoplastic material to be strewn, inclusively the micronized material, before or during strewing. This in fact allows faster melting and thus faster consolidation. A uniform increased temperature is achieved in the strewn material. Or, whether or not in combination with the above, the strewn material can be heated prior to being consolidated or prior to being introduced into the possible press device. Preferably, the pre-heating, prior to, during and/or after strewing, results in a temperature of 30° C. or more at least at the surface of the strewn material.

The thermoplastic material to be strewn, inclusively the micronized material, can be strewn on a reinforcement layer, or a reinforcement layer can be provided on the strewn, however, not yet consolidated, thermoplastic material. The reinforcement layer preferably is a glass fiber layer, such as, for example, a glass fiber fleece, a glass fiber cloth or a glass fiber mesh. The reinforcement layer functions as a carrier during the strewing and consolidation process. Apart therefrom, it increases the dimensional stability of the substrate with varying temperature. Also, the reinforcement layer, if it is situated between the aforementioned substrate layer and strewn thermoplastic material of a second substrate layer, prevents a mutual mixing of the strewn materials, which certainly is of importance when the strewn materials differ from each other, for example, in respect to synthetic material, rigidity, plasticizer, filling degree, density, blowing agent and so on. The reinforcement layer preferably is impregnated with the strewn thermoplastic material or at least with a part of this material, for example, with a part of the micronized material. Certainly the impregnation with the micronized material is performed particularly smooth due to the fine distribution. Moreover, a very good embedding of the reinforcement layer is obtained, which reduces the risk of delamination and provides for an extremely stable substrate. The use of a glass fiber fleece provides for an even smoother and better impregnation. The impregnation preferably is obtained during the consolidation of the strewn thermoplastic material. Possibly, the reinforcement layer, whether or not in combination with the preceding, separately and prior to strewing the thermoplastic material on the reinforcement layer or prior to providing the reinforcement layer on the strewn substrate layer, can be impregnated with thermoplastic material, for example, with a plastisol, such as a PVC plastisol. The weight of the reinforcement layer preferably is less than 65 grams per square meter or even maximum 50 grams per square meter, however, it is not excluded that a heavier reinforcement layer is applied. A light-weight reinforcement layer is impregnated faster, which can increase the consolidation speed. Such light-weight reinforcement layer is particularly useful with rigid PVC for compensating the more difficult melting thereof. In fact, this is valid for rigid thermoplastic material in general. It is also noted that it is not excluded that more than one reinforcement layer is present in the substrate. Preferably, each of the present reinforcement layers has a weight of less than 65 grams per square meter.

The substrate layer may or may not be foamed. When the substrate layer is not foamed, it has a very good resistance against telegraphy and indentation as it is very dense. The density thereof preferably is situated between 1300 and 2000 kg per cubic meter, or more preferably between 1500 and 2000 kg per cubic meter. If the substrate layer is foamed indeed, this results, amongst others, in an increased dimensional stability with varying temperature. By foaming, preferably a density reduction is obtained of at least 10%, at least 20%, at least 30% or even at least 40% in respect to the unfoamed thermoplastic material.

In the case of foaming, the thermoplastic material to be strewn also comprises a blowing agent. Preferably, the thermoplastic material to be strewn is a mixture of this blowing agent and the micronized material. The micronized material can be blended with the blowing agent beforehand, after which this mixture is introduced into a strewing unit and is strewn. Or they may be introduced separately into the strewing unit and mixed therein and thereafter be strewn. The fine distribution of the micronized material provides for that the blowing agent can be easily blended therewith. Moreover, herein the blowing agent is not damaged and thus remains effective. Due to the micronized material, the consolidation will be performed rather fast, notwithstanding the insight that the foam, during consolidating, can function as an insulator. Moreover, with the micronized material a high filler proportion can be achieved without problems, such contrary to working with dryblend material.

The mixture preferably comprises the micronized material and a dryblend material with the blowing agent. This blowing agent preferably is pre-mixed with the dryblend material, wherein the term "pre-mixed" indicates that the blowing agent is mixed with the dryblend before mixing it with the micronized material. In the dryblend, the blowing agent keeps its efficiency in an optimum manner. Moreover, the dryblend is very easy to mix with the micronized material, which provides for a very efficient and homogenous foaming. For clarity's sake, it is noted that the dryblend material is thermoplastic material, too. In order to enhance the affinity between both materials, the dryblend preferably comprises the same synthetic material as the micronized material, for example, PVC. The rigidity, too, preferably is equal or approximately equal. When, for example, rigid PVC is applied for the micronized material, this preferably also is so for the dryblend. The same is valid with semi-rigid or flexible PVC. The dryblend material preferably has only a small proportion of filler or even may be free from filler. When filler is applied, the amount of filler in the dryblend preferably is less than 20, less than 15 or even less than 10 percent by weight in respect to the total weight of the dryblend material provided with the blowing agent. This provides for a reduced risk of a substrate layer which is too brittle. The micronized material, on the contrary, may in fact have a larger proportion of filler without problems, which provides for that the substrate layer, notwithstanding the presence of the dryblend, still can be highly filled and sufficiently ductile, thus, not too brittle. In order to obtain the desired foaming, for example, with the aforementioned density reductions, only a small amount of the dryblend material has to be used. The weight percentage of the dryblend material provided with blowing agent in respect to the total weight of the mixture preferably is situated between 1% and 25% or more preferably between 5% and 15%. The amount of micronized material preferably is higher, for example, in order to thus obtain a high proportion of filler in the substrate layer. The weight percentage of the micronized material in respect to the total weight of the mixture preferably is situated between 75% and 99% or more preferably between 85% and 95%. The aforementioned mixture may consist exclusively of the micronized material and the dryblend provided with the blowing agent. The micronized material itself preferably is free from blowing agent or, if it indeed does contain blowing agent, this is preferably in a smaller amount than in the dryblend. The dryblend material preferably shows one or both of the following characteristics:

the dryblend material comprises PVC, preferably with a K (Fikentscher) value of maximum 60;

the dryblend material comprises a copolymer, preferably a vinyl acetate-based copolymer, such as vinyl chloride-vinyl acetate, which preferably has a K (Fikentscher) value of maximum 60 or maximum 58; and the copolymer is present in an amount between 30 and 50 phr.

These characteristics provide for that a rather good blending is obtained among the components of the dryblend. As the inventor has found, the use of PVC obtained by emulsion polymerization, abbreviated E-PVC, in the dryblend is particularly advantageous. Compared to S-PVC, such PVC allows rendering the dryblend material finer, for example, with an average particle size of less than 100 micrometer or less than 10 micrometer. Hereby, a better blending of the E-PVC grains with the additives or the possible filler is possible. The result is that the risk of a substrate layer being too brittle is limited further. Due to the E-PVC, also a higher amount of filler can be present in the dryblend material. For example, the weight percentage thereof in respect to the total weight of the dryblend can be at least 20%.

It is also possible that the blowing agent as such is blended with the micronized material and thus is not pre-mixed or the like in dryblend or other material.

The blowing agent can be a chemical blowing agent, such as azoisobutyronitrile and/or azodicarbonamide, and/or expandable microspheres, which are known as such from document WO 2013/178561.

Foaming the strewn thermoplastic material preferably takes place during the consolidation of this material. If a press device is used for this consolidation, the foaming thus preferably takes place in this press device. In this case, no additional device is necessary for the foaming process. However, in fact it is desirable that the foaming and consolidating parameters are matched to each other. For example, it is useful that the decomposition temperature of the blowing agent is equal or approximately equal to the melting temperature of the micronized material and/or the dryblend material. Herein, the use of the aforementioned copolymer in one or both of these materials is useful, considering that via this copolymer the melting temperature can be adjusted, or matched, to the decomposition temperature.

The press device preferably is a double-belt press. This double-belt press preferably comprises a heating zone, a cooling zone and in between those a shaping zone in which the actual shaping of the substrate layer is performed. In the heating zone, the strewn thermoplastic material is heated in order to reach the melting temperature. The cooling zone provides for that a fast further processing of the substrate is possible, if this should be necessary. The shaping zone preferably comprises a so-called S-roller, namely a pressing roller having an extensive contact with the substrate layer to be pressed, for example, a contact over more than 30° of the circumference of the respective roller. Such roller provides for a good calibration of the substrate. The use of an isochoric pressing portion in the double-belt press is also advantageous, for example, in the cooling zone, in which the substrate is calibrated. Such calibration certainly is useful if the substrate layer is foamed.

The use of an isochoric double-belt press or an isochoric press for consolidating the strewn thermoplastic material under the influence of heat and/or pressure is advantageous as such. By such press system the thickness of the product in fact can be adjusted precisely. Thus, this application forms a particular independent aspect of the present invention, defined as a method for manufacturing a single- or multi-layered substrate, which more particularly is suitable for a floor panel, wherein for forming a substrate layer thermoplastic material is strewn and this strewn thermoplastic material is consolidated, under the influence of pressure and/or heat, in an isochoric press device or in a press device having an isochoric press part. This particular independent aspect can show one or more of the characteristics of the first aspect without thereby necessitating that the thermoplastic material must be micronized or must comprise micronized material. The aspect preferably is applied in the case that the strewn thermoplastic material is foamed in the press device or in the isochoric press part of the press device. Due to the isochoric character, the influence of the foaming on the thickness of the substrate or the substrate layer can be controlled very well. The press device preferably is an isochoric double-belt press or preferably is a double-belt press with an isochoric press part.

It is also noted that strewing a mixture of a dryblend provided with blowing agent and another material as such forms an inventive idea, without necessitating that this other material must be micronized. It allows to obtain a well-foamed product, whereas the other material, preferably granulate and/or micro-granulate, can be employed for adjusting other features, such as the filling degree and/or the rigidity. Therefore, the invention, according to an independent second aspect, relates to a method of the aforementioned type, with the characteristic that the strewn thermoplastic material is foamed and to this aim the thermoplastic material to be strewn is a blend of at least a dryblend material provided with blowing agent and another material. Preferably, the blowing agent is pre-mixed with the dryblend. The other material does not have to be micronized. Preferably, it comprises granulate and/or micro-granulate. The other material can show one or more of the characteristics of the aforementioned material to be micronized or the material forming the basis of the micronized material. The second aspect can show one or more of the characteristics of the first aspect, without therein necessitating that the thermoplastic material to be strewn comprises micronized material.

Which as such is advantageous, too, is the use of E-PVC in dryblend material. It allows obtaining a better mixing of the E-PVC grains with the additives or the possible filler. Therefore, the invention, according to an independent third aspect, relates to a method of the aforementioned type, with the characteristic that the thermoplastic material to be strewn comprises a dryblend material with E-PVC. In particular, a blowing agent can be present in this dryblend for foaming the strewn thermoplastic material. This third aspect can show one or more of the characteristics of the preceding aspects, without necessitating that the thermoplastic material to be strewn comprises micronized or other material. In particular, the thermoplastic material to be strewn may consist completely of the aforementioned dryblend material with E-PVC and may only this material be used for forming the respective substrate layer.

Heating the thermoplastic material to be strewn prior to or during strewing as such also forms an inventive idea. It allows faster melting and thus faster consolidation. A uniformly increased temperature is achieved in the strewn substrate layer. Therefore, the invention, according to an independent fourth aspect, relates to a method of the aforementioned type, with the characteristic that the thermoplastic material is heated prior to being strewn and/or during strewing. This heating preferably results in a temperature of 30° C. or more at least on the surface of the strewn substrate layer. This fourth aspect further can show one or more of the characteristics of the preceding aspects, without therein necessitating that the thermoplastic material to be strewn comprises micronized material, dryblend material or blowing agent.

It is also noted that the substrate layer preferably is a layer with a substantially homogeneous, or entirely homogeneous, composition. Preferably, in this layer no separation layer or the like, such as a reinforcement layer, is embedded.

The aforementioned substrate is a single- or multi-layered substrate. In a multi-layered substrate, at least one of the substrate layers is made according to the invention. The other layers in the substrate can show one or more of the preceding characteristics, however, this is not necessarily the case. They even do not have to be manufactured by a strewing and consolidating process. Other techniques are possible, such as a calendering or coating technique. The multiple substrate layers may or may not differ from each other, for example, in respect to synthetic material, rigidity, plasticizer, filling degree, density, foaming degree and so on.

On the substrate, a decor, such as a wood or stone decor, can be provided on the substrate, as well as possibly a transparent or translucent wear layer and/or a transparent or translucent lacquer layer, preferably after said consolidation. This is particularly useful when manufacturing a decorative floor panel, i.e. a floor panel with a decor.

The decor preferably is a printed decor. For example, this decor can be printed on a decor carrier, preferably on a thermoplastic foil or film, such as a foil or film of PVC, PE, PP, PU or PET. Or the decor can be printed directly on the substrate, which possibly is provided with a primer or basic layer. Or the decor can be printed on the lower side of the possible wear layer.

The wear layer preferably comprises thermoplastic material, wherein this material can comprise PVC, PE, PP, PU and/or PET as the thermoplastic material. The wear layer can be a film or foil. The thickness of the wear layer preferably is situated between 250 and 750 micrometer.

The lacquer layer preferably is realized on the basis of urethane acrylate, polyester acrylate and/or epoxide acrylate. The lacquer layer preferably is curable via UV or excimer radiation.

From the substrate, or from the aforementioned substrate layer, coupling parts can be manufactured, or anyhow at least a part of these coupling parts, which allow effecting a mechanical locking between two of such panels. Such coupling parts are known as such, for example, from document WO 97/47834. The mechanical locking preferably is active in the direction perpendicular to the plane of the coupled floor panels and/or in the direction in the plane of the floor panels and perpendicular to the coupled edges. Cutting tools, such as milling tools, can be applied for manufacturing the coupling parts.

It is also noted that the substrate preferably forms a continuous material web which, after consolidation and preferably after the possible providing of decor, wear and/or lacquer layer, is subdivided into smaller pieces of the size of floor panels, for example, via cutting and/or sawing treatments. Providing the possible coupling parts preferably takes place after dividing.

The thickness of the entire floor panel preferably is relatively small, i.e. situated between 2 and 10 mm or between 2 and 8 mm or between 3 and 8 mm. This does not only offer material savings, it is also useful in certain applications, such as renovation works, where the floor panel can be installed without any problem on an existing floor. From the above, it is clear that the invention is excellently suitable for manufacturing such thin floor panels, considering that it is possible to realize the substrate very thin.

It is noted that in the case of a decorative floor panel the substrate forms that part of the floor panel that is situated underneath the decor or the possible decor carrier.

The invention is not restricted to substrates which are suitable for floor panels, however, can also be applied advantageously when manufacturing substrates which are suitable for any panels whatsoever, such as wall, ceiling or door panels. Still more in general, the invention can be applied for manufacturing any substrate or plate.

It is noted that the value intervals mentioned herein comprise the mentioned margins thereof, if not explicitly stated otherwise.

BRIEF DESCRIPTION OF THE DRAWINGS

With the intention of better showing the characteristics of the invention, herein below, as examples without any limitative character, some preferred embodiments are described, with reference to the accompanying drawings, wherein:

FIG. 1 in top plan view represents a floor panel which is obtained by means of a method according to the invention;

FIG. 2 represents a cross-section according to line II-II in FIG. 1;

FIGS. 3 and 4 represent how a plurality of the floor panels of FIG. 1 can be coupled;

FIG. 5 in an enlarged view represents what is indicated by frame F5 in FIG. 2;

FIG. 6 represents an alternative to FIG. 2; and

FIG. 7 represents some steps in the method by which the floor panel of FIG. 1 is manufactured.

DETAILED DESCRIPTION OF THE INVENTION

In FIG. 1 in top plan view a floor panel 1 is shown. It is a decorative floor panel 1 with a wood decor 2. The panel 1 is rectangular and oblong and thus has a pair of long sides 3-4 and a pair of short sides 5-6. The long sides 3-4 are provided with coupling parts 7-8 which allow effecting a mechanical locking between two of such panels 1. The structure thereof will be described later in respect to FIG. 2. The short sides 5-6, too, can be provided with such coupling parts.

From FIG. 2, the composition of the floor panel 1 becomes clear. The panel 1 comprises, from bottom to top, a multi-layered substrate 9, a decor carrier 10 with the decor 2, a transparent or translucent wear layer 11 and a transparent or translucent lacquer layer 12.

The substrate 9 consists of four substrate layers 9A-9B-9C-9D. Each of the substrate layers 9A-9B-9C-9D has a substantially or entirely homogeneous composition. The substrate layers 9A-9B-9C-9D all are composed of thermoplastic material. However, while the substrate layers 9A-9B-9C consist of rigid PVC, in the substrate layer 9D this is semi-rigid or flexible PVC. The composition of the thermoplastic material is described in greater detail with reference to FIG. 7. That the substrate 9 in part is made of rigid PVC implies various advantages. Due to its inherent rigidity, the rigid PVC forms a barrier against telegraphy. Due to the rigid character, the panel 1 as a whole also is easier to install, as it will bend less easily than, for example, flexible LVT ("Luxury Vinyl Tile") panels. Strong coupling parts 7-8 can be milled from the rigid part of the substrate 9. These provide for a strong mechanical locking between mutually coupled panels 1. Moreover, the more flexible substrate layer 9D provides for an agreeable walking comfort. It also damps the sound occurring when the panels 1 are walked upon. The rigid substrate layers 9A-9B-9C all are unfoamed. Those are also called "compact" layers. As they are unfoamed, they offer a good resistance against telegraphy and indentation. The density of the layers 9A-9B-9C is situated between 1500 and 2000 kg per cubic meter. The more flexible substrate layer 9D also is unfoamed. The thicknesses of the substrate layers 9A-9B-9C-9D fulfill the following:

The thickness T1 of the substrate layer 9A is situated between 0.5 and 1.5 mm;

the thickness T2 of the substrate layer 9B is situated between 1.35 and 2.65 mm;

the thickness T3 of the substrate layer 9C is situated between 0.4 and 0.6 mm; and the thickness T4 of the substrate layer 9D is situated between 0.4 and 0.9 mm.

The total thickness TS of the substrate 9 is situated between 2.65 and 5.65 mm.

In the substrate 9, two light-weight glass fiber fleeces 13A-13B are present. They each weigh less than 65 grams per square meter. The glass fleeces 13A-13B are situated offset from the center of the panel 1, the one 13A in the lower half and the other 13B in the upper half. Each of the glass fleeces 13A-13B is enclosed between rigid substrate layers. The lower glass fleece 13A is enclosed between the layers 9A and 9B, and the upper glass fleece 13B between the layers 9B and 9C. This offers a particularly stable sandwich structure having a reduced risk of warping.

The decor carrier 10 is a PVC film which is printed with the wood decor 2. The thickness thereof is approximately 0.1 mm. The wear layer 11 is a PVC film. The thickness T5 of the wear layer 11 is situated between 0.25 and 0.75 mm and here approximately 0.55 mm. The lacquer layer 12 is realized on the basis of a UV-curable PU lacquer. It is not excluded to provide more than one lacquer layer. This is described as such in the document BE 2016/5732, also by the present applicant, however, not yet published when filing the present application.

The thickness T of the entire panel 1 is situated between 3 and 6.5 mm and here approximately 4.5 mm.

The panel 1 is provided with a chamfer or bevel 14 along the upper edge of the long sides 3-4. The bevels 14 do not extend deeper than the wear layer 11. In a variant, the bevels 14 can extend up into the substrate 9. These deeper bevels preferably are decorated. This can be performed, for example, by providing a separate paint layer thereon.

The coupling parts 7-8 substantially are manufactured from the rigid substrate layers 9A-9B-9C. This provides for that they are strong and, as a result, provide a strong mechanical locking between mutually coupled panels 1. The coupling parts 7-8 consist of a tongue 15 and a groove 16. The groove 16 is bordered by an upper lip 17 and a longer lower lip 18. The cooperation between the upper side of the tongue 15 and the lower side of the upper lip 17 in the coupled condition effects the locking in the direction V. Moreover, locking elements 19-20 are present, which counteract the moving apart of the tongue 15 and the groove 16 in the direction H. The locking elements 19-20 are provided at the lower side of the tongue 15 and the upper side of the lower lip 18. The lower glass fleece 13A is situated in the lower lip 18 and extends uninterruptedly therein. This provides for a strongly made lip. This strength is advantageous, considering that this lip 18 is bent out during coupling and thus is subjected to a certain load. Even after coupling, the lip 18 still can be bent in order to supply a tensioning force which presses the coupled panels 1 towards each other. In this case, this is called "pretension", such as known as such from document WO 97/47834.

The coupling parts 7-8 are of the "angling type". This means that they can be joined into each other by means of a movement W, such as illustrated in FIG. 3. The locking elements 19-20 are brought one behind the other by means of an angling movement.

Moreover, they are also of the "snap type". This means that the coupling parts 7-8 can be joined into each other by means of a movement S, as illustrated in FIG. 4. The locking elements 19-20 are brought behind each other by means of a translation movement substantially or entirely parallel to the plane of the panels 1. Herein, a snap effect occurs due to the elastic movement of the lower lip 18.

It is also noted that at the short sides 5-6, too, coupling parts can be provided. They can be of the same type of have the same shape as the coupling parts 7-8, however, this is not necessarily the case. They can be of the angling and/or snap type; however, they can also be of the "push-lock" type. Such coupling parts can be joined into each other by means of a translation movement substantially or entirely perpendicular to the plane of the floor panels. In this case, the panel 1 can also be coupled, in one and the same angling movement, at its long side as well as at its short side to adjacent panels 1. This is called a "fold-down" panel, such as known as such from document WO 01/75247.

FIG. 5 is an enlarged representation of what is indicated by frame F5 in FIG. 2. It clearly shows that in the upper surface of the panel 1 a relief 21 is present. This relief 21 is used for simulating a wood texture. It is formed by means of mechanical embossing. To this aim, a roller can be employed. The relief 21 consists of a plurality of indentations 22. The relief 21 may or may not be realized in register with the wood decor 2. The relief 21 does not reach deeper than the wear layer 11. In a variant, a deeper relief can be applied. To this aim, the substrate 9 can be deformed. Herein, the use of the more flexible substrate layer 9D is advantageous, as, due to the inherent flexibility, it can be indented easily, for example, by the roller.

In FIG. 6, an alternative substrate construction is shown. The substrate 9 consists of five substrate layers 9A-9B-9C-9D-9E. Each of these substrate layers 9A-9B-9C-9D-9E also has a substantially or entirely homogeneous composition. All of the substrate layers 9A-9B-9C-9D-9E are composed of thermoplastic material. Just like in FIG. 2, a number of these layers are made of rigid PVC and not foamed. Those are the substrate layers 9A and 9C. The substrate layer 9B also consists of rigid PVC, however, is foamed. The advantage thereof is that the entire panel 1 can be made thicker without being much heavier. Also, such layer has proven to be more stable under the influence of temperature variations than non-foamed layers. The substrate layer 9D then again consists of semi-rigid or flexible PVC. The substrate layer 9E consists of XPE foam and is glued to the substrate layer 9A. This one primarily provides for sound damping. In a variant, this layer 9D can be composed of another sound-damping material, such as cork or the like. The thicknesses of the substrate layers 9A-9B-9C-9D-9E fulfill the following:

the thickness T1 of the substrate layer 9A is situated between 0.5 and 1.5 mm and here in particular approximately 0.9 mm;

the thickness T2 of the substrate layer 9B is situated between 2.35 and 3.15 mm and here in particular approximately 2.8 mm;

the thickness T3 of the substrate layer 9C is situated between 0.4 and 0.6 mm and here in particular approximately 0.5 mm;

the thickness T4 of the substrate layer 9D is situated between 0.4 and 0.9 mm; and the thickness T5 of the substrate layer 9E is situated between 1 and 2 mm.

The overall thickness TS of the substrate 9 is situated between 4.65 and 8.15 mm.

In the substrate 9, again two light-weight glass fleeces 13A-13B are present. They each weigh less than 65 grams per square meter. They enclose the foamed substrate layer 9B, and along their other side they are bordered by the substrate layers 9A and 9C, respectively. This again results in a very stable sandwich structure.

The decor carrier 10, the wear layer 11 and the lacquer layer 12 are similar or identical to those from FIG. 2.

The thickness T of the whole panel 1 is situated between 5 and 9 mm and here approximately 7 mm.

Bevels 14 are provided, too. In the upper surface of the panel 1, a relief is present, which, however, is not represented here.

The coupling parts 7-8 are realized similar to those from FIG. 2. They also are of the angling and snap type.

It is also noted that the panel and substrate construction shown in FIGS. 2 and 6 is known as such from documents BE 2016/5868 and BE 2016/5869, both by the same applicant, however, not yet published when filing the present application. Variants described therein can be applied here as well.

FIG. 7 shows how the substrate 9 from FIGS. 2 and 6 can be manufactured. For forming the substrate layer 9A, thermoplastic material 23A is strewn. This material 23A is strewn onto the transport conveyor 25 by means of the strewing unit 24A. The material 23A consists entirely of micronized material. This micronized material shows the following characteristics:

the micronized material comprises rigid PVC and maximum 10 phr plasticizer;

the micronized material comprises filler, such as chalk, talc and/or lime, with a weight percentage situated between 30% and 60% in respect to the total weight of the micronized material and here with a weight percentage of approximately 45%; and the micronized material comprises between 20 and 40 phr vinyl chloride-vinyl acetate and here approximately 30 phr of this copolymer.

Micronizing has been performed offline. During micronization, granulate with the same characteristics as herein above has been ground. The grains of the granulate were disk-shaped. From this ground granulate, the micronized material was selected by sieving. The not-selected and thus coarser material was recirculated and again sent to the grinding process. The D50 value of the micronized material is situated between 100 and 750 micrometer and here approximately 300 micrometer.

The thermoplastic material 23A is pre-heated in the strewing unit 24A. This may be by thermally radiating this material 23A therein. A variant is possible when a rotating dosing roller is present in the strewing unit 23A. Then this dosing roller can be heated and the material 23A is heated while being transported via this roller.

The glass fleece 13A is provided on the strewn substrate layer 9A. This glass fleece 13A is wound off the roll 26A.

For forming the substrate layer 9B, thermoplastic material 23B is strewn. This material 23B is strewn by means of the strewing unit 24B onto the transport conveyor 25 and in particular on the glass fleece 13A. This material, too, is pre-heated in the strewing unit 24B. In the substrate layer 9B of FIG. 2, the material 23B shows the same characteristics as mentioned herein above for the material 23A. Thus, it consists entirely of micronized material which is produced in the above-mentioned manner. This is different for the substrate layer 9B of FIG. 6. Here, the material 23B is a mixture of micronized material and dryblend material. The mixture is prepared before it is introduced into the strewing unit 24B. A blowing agent for foaming the material 23B is present in the dryblend material. It is a chemical blowing agent, namely, azodicarbonamide. The blowing agent is pre-mixed into the dryblend material. The micronized material shows the same characteristics as mentioned herein above for the material 23A. It is also manufactured in the same manner by grinding granulate offline. The micronized material itself is free from blowing agent.

The dryblend material shows the following characteristics:

the dryblend material comprises rigid PVC and here approximately 12 phr plasticizer;

the PVC has a K (Fikentscher) value of maximum 60;

the PVC is S-PVC;

the dryblend material comprises vinyl chloride-vinyl acetate with a K (Fikentscher) value of maximum 58 and in an amount between 30 and 50 phr and here in an amount of approximately 40 phr; and the dryblend material comprises filler, such as chalk, talc and/or lime, with a weight percentage in respect to the total weight of the dryblend material of less than 10% and here with a weight percentage of approximately 7% to 8%.

The mixture consists of approximately 90% of the micronized material and approximately 10% of the dryblend material provided with blowing agent.

On the strewn substrate layer 9B the glass fleece 1B is provided. This glass fleece 13B is wound off the roll 26B.

For forming the substrate layer 9C, thermoplastic material 23B is strewn. This material 23C is strewn by means of the strewing unit 24C onto the transport conveyor 25 and in particular on the glass fleece 13B. The material 23C shows the same characteristics as mentioned herein above for the material 23A. Thus, it consists entirely of micronized material which is produced in the above-mentioned manner. This material 23C, too, is pre-heated in the strewing unit 24C.

The consolidation of the substrate layers 9A-9B-9C takes place in the heated press device 2. This is a double-belt press with heating elements 28, an S-roller 29 and cooling elements 30. In this press device the glass fleeces 13A-13B are also impregnated with the thermoplastic material of the substrate layers 9A-9B-9C. This is performed particularly smooth as they are relatively light-weight, and due to the use of the micronized material. The foaming of the strewn material of the substrate layer 9B of FIG. 6 also takes place in this press device 27.

Once out of the press device 27, the substrate 9 can be processed further. The more flexible substrate layer 9D is provided on the substrate layer 9C. This is performed by means of the calendering device 31. The substrate layer 9D is provided as a liquid mass on the consolidated substrate layer 9C by means of at least two calendering rollers 32.

Thereafter, the decor carrier 10, provided with the decor 2, and the wear layer 11 can be provided on the substrate layer 9D. This can be, for example, by means of a thermal laminating process. Herein, the decor carrier 10 and the wear layer 11 can be provided as a continuous film. They may or may not be provided together.

Subsequently, the lacquer layer 12 is provided on the wear layer 11. This is preferably performed by means of a roller. The UV-curable PU-lacquer 12 can be provided prior to or after the mechanical embossing of the relief 21. If the lacquer 12 is provided beforehand, the curing preferably is performed thereafter. Herein, it is, however, not excluded that the lacquer 12 is already partially cured before embossing. The curing of the lacquer 12 is performed by means of UV lamps.

Subsequently, the continuous material web is subdivided into smaller pieces in order to form the panels 1. This can be by means of a sawing or cutting process.

The substrate layer 9E from FIG. 6 is glued to the substrate layer 9A. This gluing takes place, for example, after subdividing the material web, however, can also be performed before this. For this gluing preferably a waterproof glue is applied. The substrate layer E is extruded. In a variant, the layer 9E, too, can be strewn and be consolidated together with the other strewn layers 9A-9B-8C. To this aim, for example, an additional strewing unit can be provided upstream from the strewing unit 24A.

After subdividing, the coupling parts 7-8 can be milled from the substrate 9. To this aim preferably rotating milling tools are applied. This is known as such from document WO 97/47834.

The present invention is in no way limited to the herein above-described embodiments; on the contrary, such floor panels and substrates can be realized according to various variants without leaving the scope of the present invention.

The invention claimed is:

1. A method for manufacturing a single- or multi-layered substrate, which is suitable for a floor panel, wherein, for forming a substrate layer, thermoplastic material is strewn onto a transport device, and the strewn thermoplastic material is consolidated under an influence of pressure and/or heat in a press device, wherein the thermoplastic material to be strewn comprises micronized material;
   wherein the micronized material comprises 12 phr or less than 12 phr of plasticizer;
   wherein the strewn thermoplastic material is foamed and to this aim the thermoplastic material to be strewn comprises the micronized material and a blowing agent;
   wherein the thermoplastic material to be strewn is a mixture of at least the micronized material and a dryblend material with the blowing agent;
   wherein the dryblend material shows one or more of the following characteristics:
      the dryblend material comprises PVC with a K (Fikentscher) value of maximum 60;
      the dryblend material comprises a vinyl chloride-vinyl acetate, which has a K (Fikentscher) value of maximum 60 or maximum 58;
      the dryblend material comprises E-PVC.

2. The method according to claim 1, wherein the micronized material is obtained by comminuting granulate or rendering it finer.

3. The method according to claim 1, wherein an average particle size of the micronized material, expressed as a D50 value or a median of a distribution, is situated between 100 and 750 micrometer.

4. The method according to claim 1, wherein the micronized material comprises one or more of the following characteristics:
   the micronized material comprises PVC,
   the micronized material comprises filler in an amount situated between 20 and 70 percent by weight in respect to a total weight of the micronized material, or between 30 and 60 percent by weight; and
   the micronized material comprises a vinyl acetate-based copolymer.

5. The method according to claim 1, wherein a thickness of the substrate layer after consolidating is situated between 0.4 and 0.6 millimeters.

6. The method according to claim 1, wherein the thermoplastic material to be strewn is heated prior to being strewn or during said strewing.

7. The method according to claim 1, wherein the thermoplastic material to be strewn is strewn onto a glass fiber layer, or a glass fiber layer is provided on the strewn, however, still not yet consolidated thermoplastic material.

8. The method according to claim 7, wherein the glass fiber layer is impregnated with the strewn thermoplastic material or at least with a portion of the thermoplastic material with a part of the micronized material during the consolidation.

9. The method according to claim 7, wherein a weight of the glass fiber layer is at or lower than 50 grams per square meter.

10. The method according to claim 1, wherein the dryblend material shows one or more of the additional characteristics:
   the dryblend material is pre-mixed with the blowing agent;
   the dryblend material comprises PVC; and
   the dryblend material comprises filler in an amount of less than 20 percent by weight in respect to a total weight of the dryblend material, or less than 15 percent by weight or less than 10 percent by weight.

11. The method according to claim 1, wherein the weight percentage of the dryblend provided with the blowing agent in respect to a total weight of a blend is situated between 1% and 25% or between 5% and 15%.

12. The method according to claim 1, wherein the weight percentage of the micronized material in respect to a total weight of a blend is situated between 75% and 99% or between 85% and 95%.

13. The method according to claim 1, wherein the micronized material itself is free from blowing agent.

14. The method according to claim 1, wherein the strewn thermoplastic material is foamed while the strewn thermoplastic material is consolidated, in the press device.

15. The method according to claim 1, wherein the press device is a double-belt press.

16. The method according to claim 1, wherein the micronized material shows a particle size distribution showing a feature that (D50-D10)/D50 is larger than 50%, wherein D50 is a median and D10 relates to a tenth percentile of the particle size distribution.

17. The method according to claim 2, wherein an average particle size of the micronized material, expressed as the D50 value or a median of a distribution, is situated between 100 and 750 micrometer.

18. The method according to claim 2, wherein the micronized material comprises one or more of the following characteristics:
- the micronized material comprises PVC,
- the micronized material comprises filler in an amount situated between 20 and 70 percent by weight in respect to a total weight of the micronized material, or between 30 and 60 percent by weight; and
- the micronized material comprises a vinyl acetate-based copolymer.

* * * * *